(12) United States Patent
Kim et al.

(10) Patent No.: US 8,208,492 B2
(45) Date of Patent: Jun. 26, 2012

(54) METHOD AND APPARATUS FOR TRANSMITTING AND RECEIVING PACKETS IN A MOBILE COMMUNICATION SYSTEM

(75) Inventors: Soeng-Hun Kim, Suwon-si (KR); Gert Jan Van Lieshout, Staines (GB)

(73) Assignee: Samsung Electronics Co., Ltd. (KR)

( * ) Notice: Subject to any disclaimer, the term of this patent is extended or adjusted under 35 U.S.C. 154(b) by 1014 days.

(21) Appl. No.: 12/109,460

(22) Filed: Apr. 25, 2008

(65) Prior Publication Data

US 2009/0059853 A1 Mar. 5, 2009

(30) Foreign Application Priority Data

Apr. 25, 2007 (KR) ........................ 10-2007-0040570

(51) Int. Cl.
*H04J 3/16* (2006.01)
(52) U.S. Cl. ........................................ 370/469
(58) Field of Classification Search ........................ None
See application file for complete search history.

(56) References Cited

U.S. PATENT DOCUMENTS

| | | | | |
|---|---|---|---|---|
| 2002/0024972 A1* | 2/2002 | Yi et al. | ........................ | 370/470 |
| 2002/0048281 A1* | 4/2002 | Yi et al. | ........................ | 370/474 |
| 2002/0174276 A1* | 11/2002 | Jiang | ........................ | 710/105 |
| 2005/0213605 A1* | 9/2005 | Kim et al. | ........................ | 370/466 |
| 2007/0047582 A1* | 3/2007 | Malkamaki | ........................ | 370/470 |
| 2007/0060139 A1* | 3/2007 | Kim et al. | ........................ | 455/445 |
| 2007/0177608 A1* | 8/2007 | Ding | ........................ | 370/395.6 |
| 2007/0253447 A1* | 11/2007 | Jiang | ........................ | 370/474 |
| 2008/0069108 A1* | 3/2008 | Yi et al. | ........................ | 370/394 |
| 2010/0111106 A1* | 5/2010 | Norris et al. | ........................ | 370/469 |

\* cited by examiner

*Primary Examiner* — Anh-Vu Ly

(74) *Attorney, Agent, or Firm* — The Farrell Law Firm, P.C.

(57) ABSTRACT

A method for transmitting a packet over a radio channel in a mobile communication system. The method includes receiving first packets from an upper layer; checking a number of and a size of the first packets to be bundled in a second packet; generating the second packet using the first packets and a header including an indicator that indicates if the number of and a size of the first packets to be bundled in the second packet satisfy a predetermined condition; and transmitting the generated second packet via a lower layer.

22 Claims, 15 Drawing Sheets

METHOD AND APPARATUS FOR TRANSMITTING AND RECEIVING PACKETS IN A MOBILE COMMUNICATION SYSTEM

PRIORITY

This application claims priority under 35 U.S.C. §119(a) of a Korean Patent Application filed in the Korean Intellectual Property Office on Apr. 25, 2007, and assigned Serial No. 2007-40570, the disclosure of which is incorporated herein by reference.

BACKGROUND OF THE INVENTION

1. Field of the Invention

The present invention relates generally to a method and apparatus for transmitting and receiving packets in a mobile communication system, and in particular, to a method and apparatus including several upper layer packets in one lower layer packet before transmission in order to reduce header overhead.

2. Description of the Related Art

In the next generation mobile communication systems, a base station schedules data transmission/reception in real time. For example, a terminal or User Equipment (UE) reports the data generation and channel condition to a base station (Step 1). The base station identifies a UE that will transmit data in the next transmission period, and determines transmission resources to be allocated to the UE, based on the data-generated state and channel state of several UEs (Step 2). Thereafter, the base station allocates the transmission resources to the UE (Step 3). In this case, the UE should undergo a preliminary operation of the above three steps in order to transmit uplink data. However, this is inefficient for the service in which a packet of several tens of bytes is periodically frequently generated, such as Voice over Internet Protocol (VoIP).

FIG. 1 illustrates an example of bundling 2 VoIP packets in one Radio Link Control Packet Data Unit (RLC PDU). For reference, RLC is a protocol layer in charge of framing for reassembling an upper layer packet in a size suitable for transmission over a radio channel. PDU is a packet output from an arbitrary protocol layer device, and Service Data Unit (SDU) is a packet being input to an arbitrary protocol layer device.

When two RLC SDUs 105 and 110 are contained in on one RLC PDU 160 and each RLC SDU is one VoIP packet, a sequence number 120, length indicators 130 and 140, and Extension (E) bits 125, 135, and 145 are contained in a header 115 of the RLC PDU.

The sequence number 120 increases by one for each RLC PDU so that a reception device of RLC PDU knows the sequence relation between received RLC PDUs. Normally, the sequence number 120 has a size of about 1 byte. The length indicators 130 and 140 indicate to which byte in an RLC PDU payload the last byte of the RLC SDU contained in the RLC PDU corresponds. The number of length indicators in one RLC PDU is determined depending on the number of RLC SDUs contained in the RLC PDU. The E bits 125, 135, and 145 are flags indicating whether the next field is a pair of a length indicator and an E bit, or data.

For example, when an RLC SDU 105 with a 35-byte size and an RLC SDU 110 with a 37-byte size are contained in the RLC PDU 160, the first length indicator 130 of the RLC PDU indicates 35 and the second length indicator 140 indicates 72.

The length indicator can also indicate an interval between the last bytes of RLC SDUs, rather than the information indicating a position of the last byte of the RLC SDU in the RLC PDU. In this case, the length indicator can also indicate a size of the RLC SDU. When the length indicator is used to indicate a size of the RLC SDU in this way, the exemplary second length indicator 140 indicates 37.

As described above, as many length indicators as the number of simultaneously containable VoIP packets are inserted into one RLC PDU. Given that the size of the length indicator is 1 byte or 2 bytes, overhead by the length indicator is ignorable. For example, in VoIP where a codec having a low data rate of 4.75 kbps is used, because a VoIP packet of about 17 bytes is mainly generated, overhead by the length indicator of 1-2 bytes reaches 6% or 12%.

Therefore, there is a need for a scheme that reduces overhead of length indicators when small-sized packets, such as VoIP packets, are simultaneously contained in one PDU.

SUMMARY OF THE INVENTION

Accordingly, the present invention has been designed to address at least the problems and/or disadvantages and to provide at least the advantages described below. Accordingly, an aspect of the present invention is to provide a method and apparatus for reducing overhead of a header when upper layer packets are contained in one lower layer packet in a mobile communication system.

In accordance with aspect of the present invention, there is provided a method for transmitting a packet over a radio channel in a mobile communication system. The method includes receiving first packets from an upper layer; checking the number of and a size of the first packets to be bundled in a second packet; generating the second packet using the first packets and a header into which an indicator is inserted, which indicates whether the number of and a size of the first packets to be bundled in the second packet satisfy a predetermined condition; and transmitting the generated second packet via a lower layer.

In accordance with another aspect of the present invention, there is provided a method for receiving a packet over a radio channel in a mobile communication system. The method includes receiving from a lower layer a second packet in which an indicator is included in a header, which indicates whether the number of and a size of first packets bundled in the second packet satisfy a predetermined condition; extracting the first packets from the second packet using the indicator; and transmitting the extracted first packets to an upper layer.

In accordance with another aspect of the present invention, there is provided an apparatus for transmitting a packet over a radio channel in a mobile communication system. The apparatus includes a transmission buffer for receiving first packets from an upper layer, and storing the received first packets; a header inserter for inserting a header into the first packets; a multiplexer for multiplexing the header and the first packets to generate a second packet; a controller for controlling the transmission buffer and the header inserter so as to generate the second packet according to a size of the second packet to be transmitted in each transmission interval; and a physical layer device for transmitting the generated second packet. The controller controls the header inserter to insert an indicator into the header indicating whether the number of and a size of the first packets bundled in the second packet satisfy a predetermined condition.

In accordance with another aspect of the present invention, there is provided an apparatus for receiving a packet over a radio channel in a mobile communication system. The apparatus includes a physical layer device for receiving a second packet from a lower layer; a demultiplexer for demultiplexing the second packet depending on a header of the second packet; a header parser for recognizing the number of and a size of first packets bundled in the second packet from an indicator included in the header, the indicator indicating whether the number of and a size of the first packets bundled in the second packet satisfy a predetermined condition, and extracting the first packets from the second packet; a reassembler for reassembling the first packets in units of service data depending on the indicator, and transmitting the reassembled first packets to an upper layer; and a controller for notifying the predetermined condition to the header parser and the reassembler.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operator intention, or usual practices. Therefore, the definition of the terms should be made based on contents throughout the specification.

First Embodiment

For convenience, an operation of simultaneously including several SDUs in one PDU will be referred to herein as "bundling".

In a first embodiment of the present invention, in setting up an arbitrary call, a network determines whether to perform bundling based on a property of the call. If the network has determined to bundle SDUs of an arbitrary call, the network determines the number of SDUs that should undergo bundling, based on the transmission delay requirement of the corresponding call. The network determines the number of bundled SDUs to be indicated as a first indicator, and a size of the bundled SDUs, based on a size of the SDU that is most frequently generated in the call. The network then notifies a UE of the number of bundled SDUs indicated by the first indicator and the size of the bundled SDUs. Thereafter, if the number of SDUs bundled in one PDU coincides with a definition given by the first indicator, a transmission device indicates the bundled state of SDUs using only the first indicator instead of length indicators inserted into individual SDUs. A reception device, if a first indicator is set in a received packet, demultiplexes the received packet into upper layer packets, identifying that a predetermined number of upper layer packets with a predetermined size are bundled in the packet.

Figure 1:
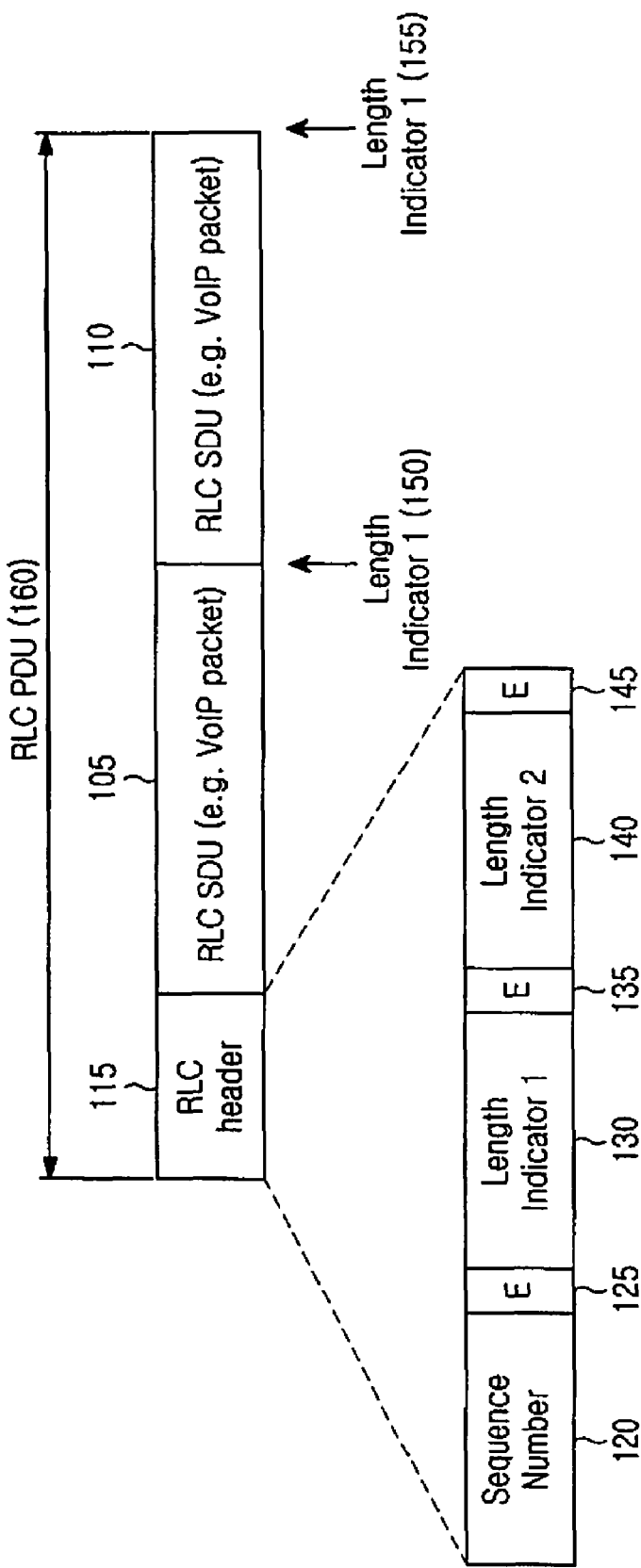
FIG. 1 illustrates an example of bundling two VoIP packets in one RLC PDU.
Figure 2:
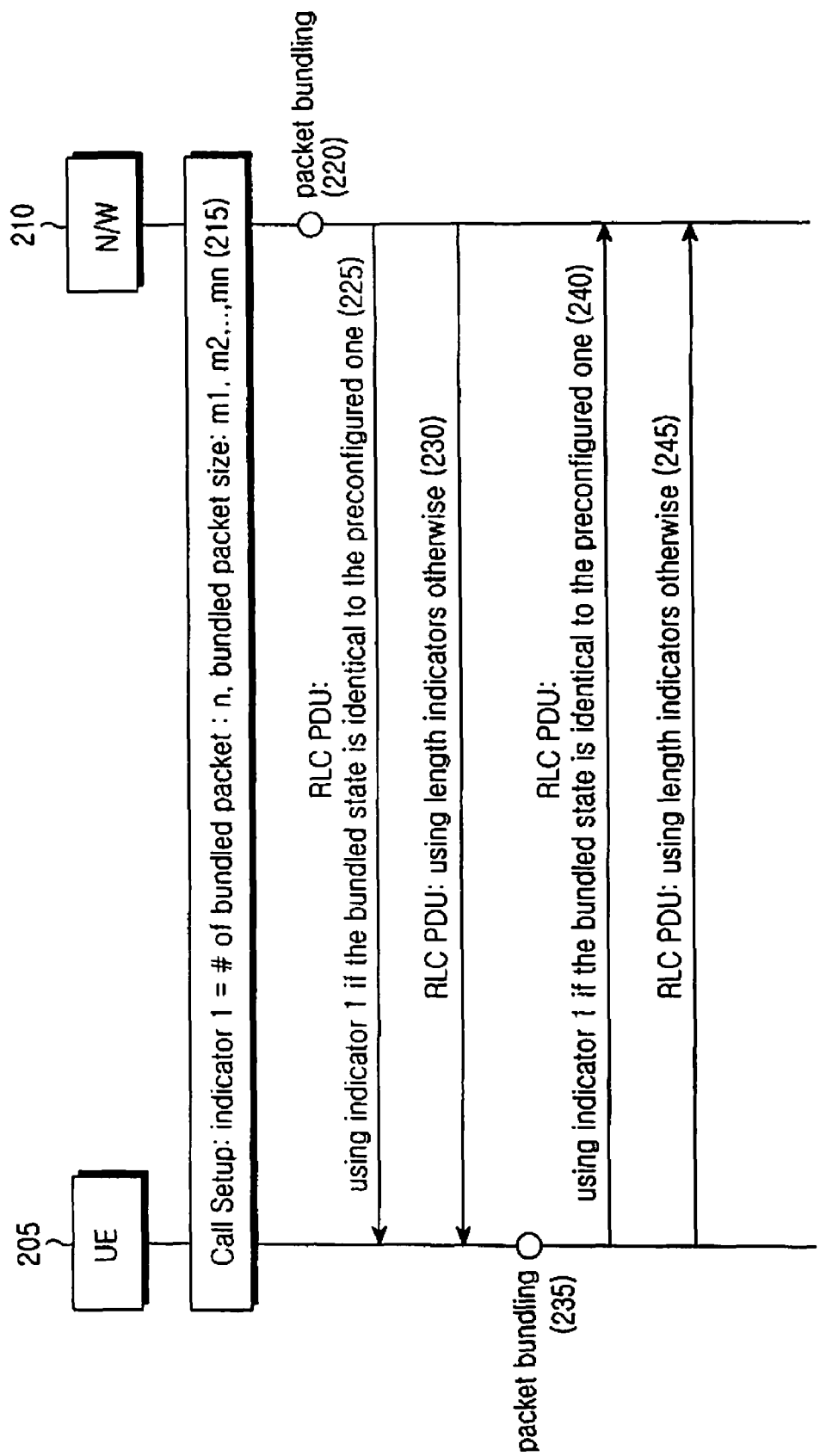
FIG. 2 illustrates an overall operation according to a first embodiment of the present invention.

FIG. 2 illustrates an overall operation according to the first embodiment of the present invention. Referring to FIG. 2, a UE 205 and a network (N/W) 210 perform a call setup process in step 215. The network 210 is an arbitrary device for managing radio transmission resources, and can be, for example, a base station.

Step 215 is generally performed in two sub-steps. First, in a step where a UE sends a request for call setup to a network, the UE 205 sends a request for call setup to the network 210, and delivers, the required service quality, for example, data rate, allowed transmission delay, etc. of the call it desires to set up to the network 210. In addition, if the UE 205 requests a voice service, such as VoIP, the UE 205 can deliver the information indicating that its requested call is VoIP.

Next, in a step where a network determines to set up Layer 1 and Layer 2, and delivers the setup information to a UE, the network 210 determines setup of Layer 1 and Layer 2 using the required service quality of the call, a setup request for which is received from the UE 205, and delivers the results to the UE 205.

Figure 3:
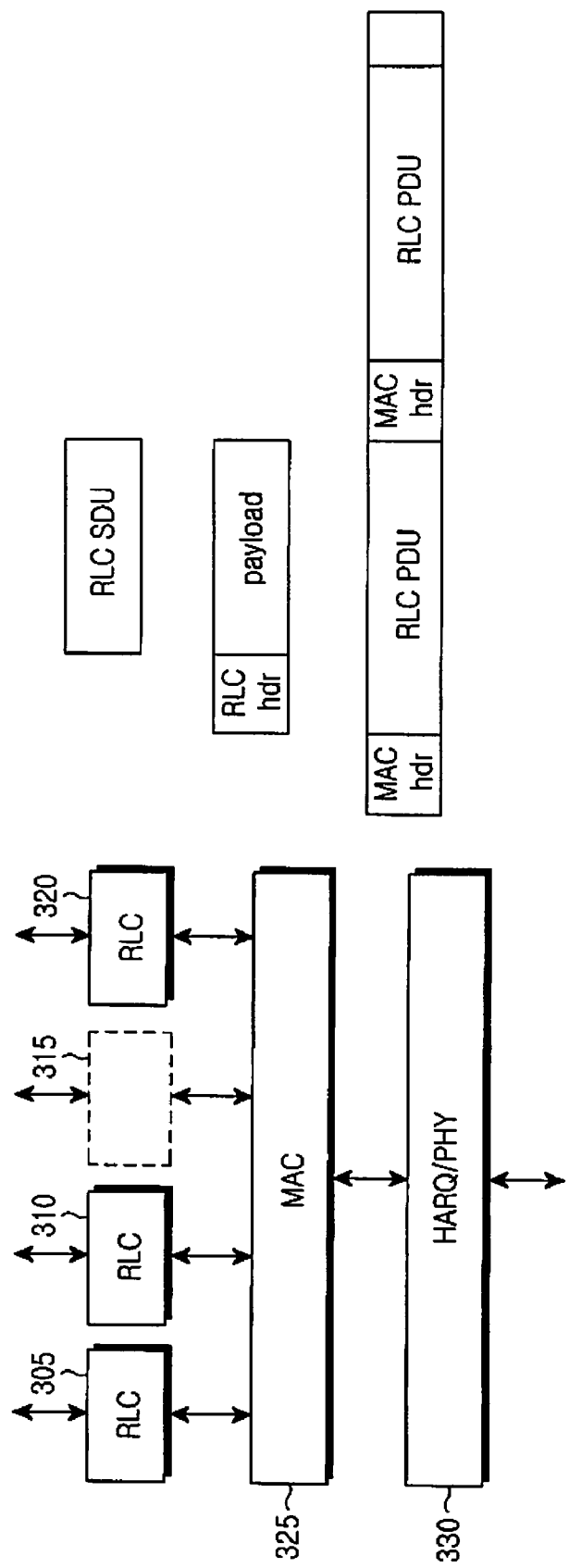
FIG. 3 illustrates a protocol structure of a mobile communication system and formats of an upper layer packet and a lower layer packet according to an embodiment of the present invention.

FIG. 3 illustrates a protocol structure of a mobile communication system and formats of an upper layer packet and a lower layer packet according to an embodiment of the present invention. Referring to FIG. 3, Layer 1 and Layer 2 include RLC layer devices 305, 310, 315, and 320, a Media Access Control (MAC) layer device 325, and a Hybrid Automatic Repeat reQuest (HARQ) and physical layer device 330.

In the step where a network determines to set up Layer 1 and Layer 2, and delivers the setup information to a UE, the network 210 defines indicator 1, and delivers information on indicator 1 to the UE 205.

Indicator 1 is preferably defined through the following processes:

The network 210 first determines whether to perform bundling based on the traffic generation characteristic of the call it desires to set up, and the transmission delay requirement.

If the network 210 has determined to perform bundling, it determines the number of packets to be subject to bundling, based upon a generation period of the packet generated in the call and a transmission delay allowed in a radio channel. If the generation period of the packet is defined as x msec and the transmission delay allowed in the radio channel is defined as y msec, the maximum number of packets that can undergo bundling is about y/x. For convenience, the number of packets that will undergo bundling will be referred to herein as "n".

The network 210 calculates a size of the packet that will be most frequently generated in the call it desires to set up. If the call that the network 210 desires to set up is a VoIP call and the network 210 has information on the type of a codec, the network 210 can estimate a size of the packet that is most frequently generated in the type of the codec. Generally, the size of the packet that is most frequently generated is well known for each type of the codec. For example, if an Internet Protocol (IP)/User Datagram Protocol (UDP)/Routing Table Protocol (RTP) header of a VoIP packet is compressed with a Robust Header Compression (ROHC) protocol, a size of the packet which is most frequently generated is as shown in Table 1, for each code rate of an Adaptive Multirate (AMR) codec.

TABLE 1

| AMR codec mode | VoIP packet size |
| --- | --- |
| AMR 4.75 k bits/s | 17 byte |
| AMR 5.15 k bits/s | 18 byte |
| AMR 5.90 k bits/s | 19 byte |
| AMR 6.70 k bits/s(PDC-EFR) | 21 byte |
| AMR 7.40 k bits/s(TDMA-EFR) | 23 byte |
| AMR 7.95 k bits/s | 25 byte |
| AMR 10.2 k bits/s | 30 byte |
| AMR 12.2 k bits/s(GSM-EFR) | 35 byte |

Therefore, for each widely used codec, the network 210 can store in a database the size of the packet that is most frequently generated. For convenience, the size of the packet that will be most frequently generated will be referred to herein as "s".

The network 210, if it determines n and s through the above process, defines a meaning of indicator 1 using n and s.

If the network 210 determines to bundle n SDUs in one PDU, because a size of most SDUs will be s, most often, n SDUs with a size s are bundled in one PDU. By setting indicator 1 such that it indicates the above state, it is possible to increase the frequency of using indicator 1 instead of length indicators, and to reduce overhead of length indicators.

Figure 4:
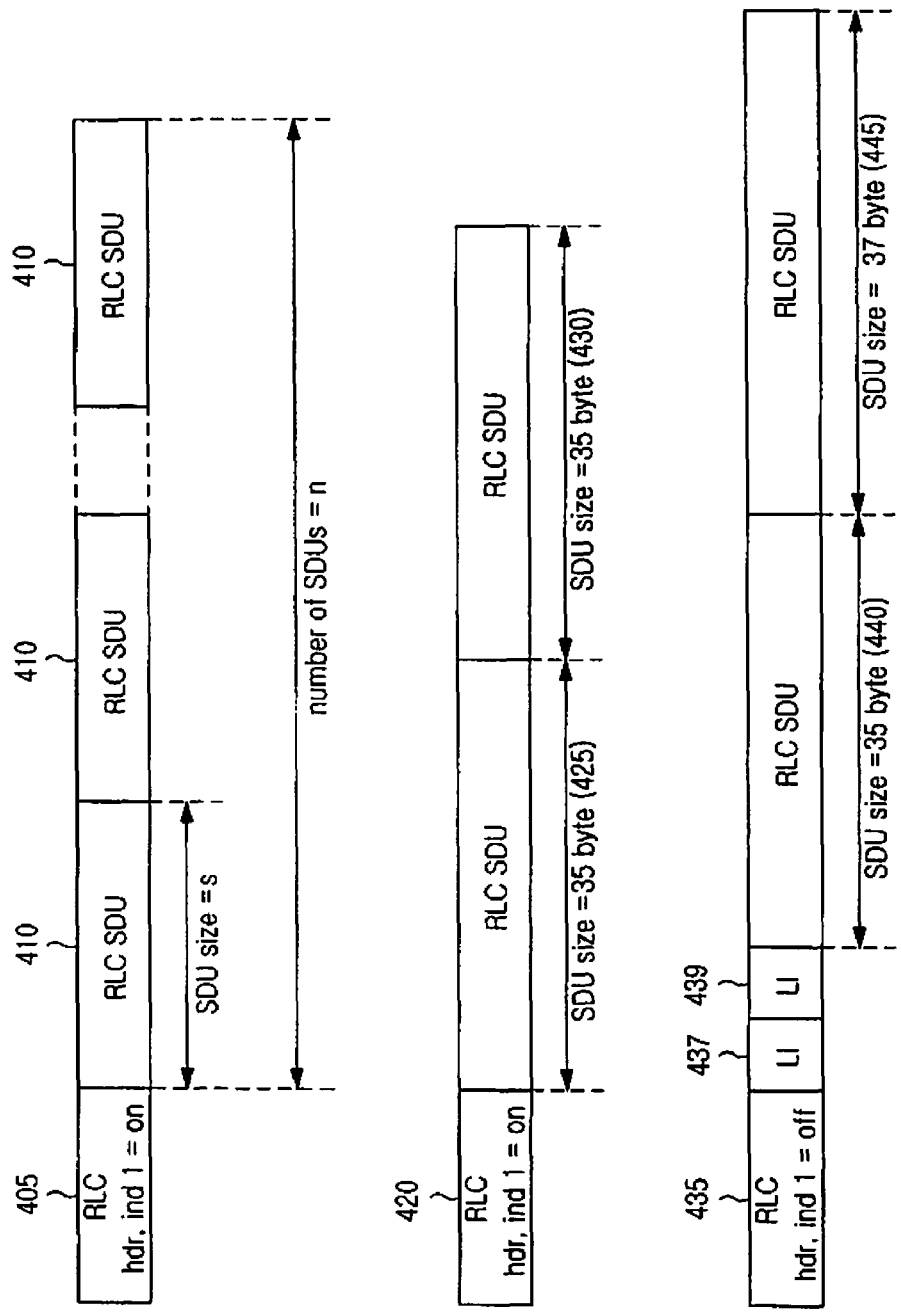
FIG. 4 illustrates indicator 1 in the first embodiment of the present invention.

FIG. 4 illustrates an indicator 1 in the first embodiment of the present invention.

Indicator 1 is set as 'on' (See 405) to indicate that n SDUs with a size s are bundled in a corresponding PDU (See 410).

In step 215, the network 210 delivers the parameters s and n to the UE 205. Different (s, n) pairs can be used in the downlink and the uplink.

In bundling SDUs in a PDU, if the bundled state is equal to that indicated by indicator 1, the network 210 generates a PDU by setting indicator 1 of a PDU header as 'on' and omitting length indicators. The network 210 then transmits the generated PDU to the UE 205 in step 225. For example, if s=35 bytes and n=2, an indicator of a header of a PDU where 2 SDUs 425 and 430 with a 35-byte size are bundled is set as 'on' (See 420), and length indicators for the SDUs 425 and 430 are omitted.

In bundling SDUs in a PDU, if the bundled state is not equal to that indicated by indicator 1, the network 210 sets indicator 1 of the PDU header as 'off', inserts length indicators in the PDU as done in the conventional method. Thereafter, the network 210 transmits the PDU to the UE 205 in step 230. For example, if an SDU with a 35-byte size and an SDU with a 37-byte size are bundled, the network 210 sets indicator 1 of the PDU header as 'off' (See 435), indicates 35 in a first length indicator 437 and 72 in a second length indicator 439, and then generates a PDU by bundling SDUs 440 and 445 therein before transmission.

An operation in the uplink is the same as to the downlink operation except that the network receives the packet transmitted by the UE. Therefore, a separate description of the uplink operation will be omitted herein.

Figure 5:
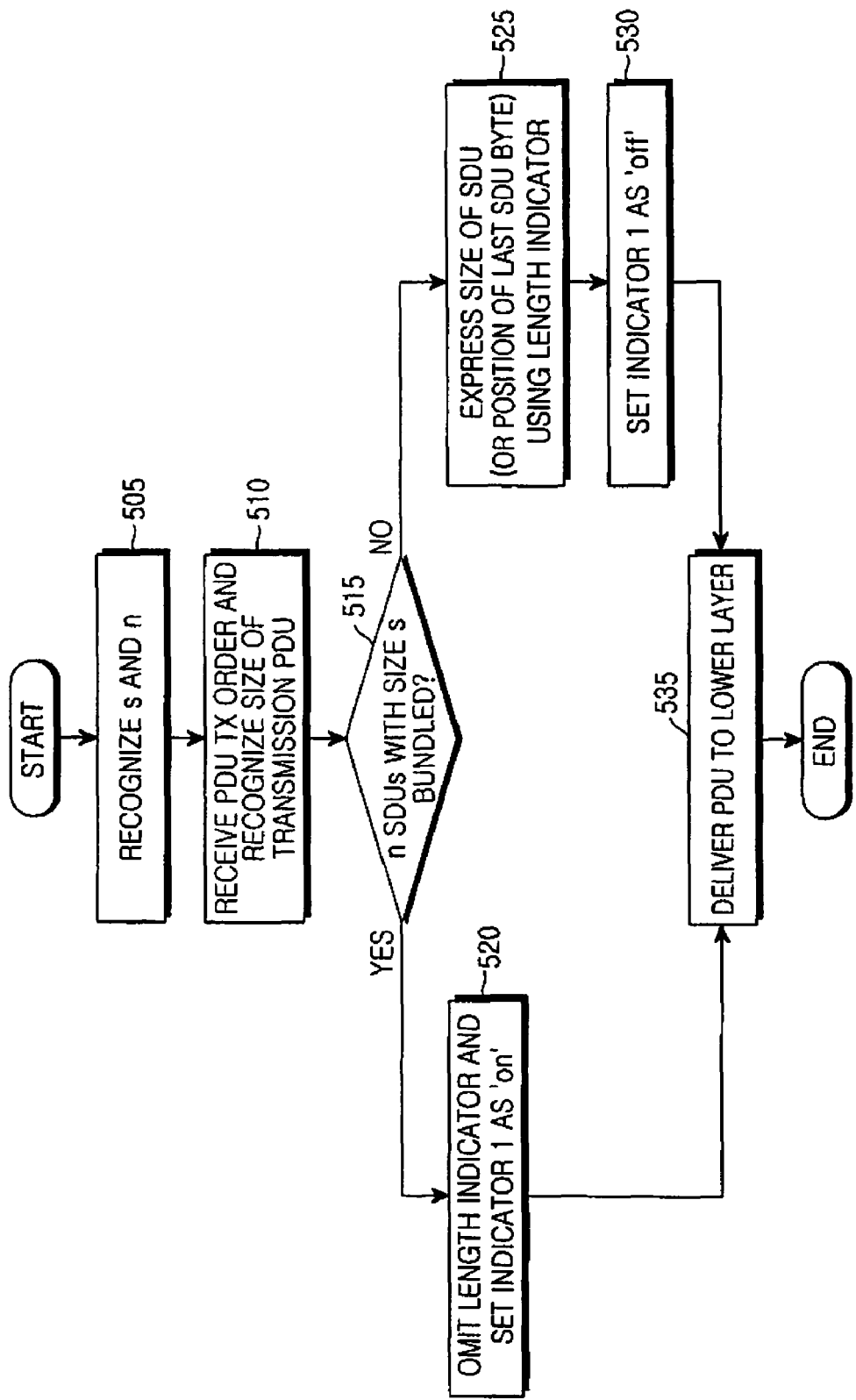
FIG. 5 illustrates an operation of a transmission device according to the first embodiment of the present invention.

FIG. 5 illustrates an operation of a transmission device according to the first embodiment of the present invention. Referring to FIG. 5, a transmission device recognizes setting conditions s and n of indicator 1 in step 505. The s and n are delivered to the transmission device in a call setup process. In step 510, the transmission device receives, from a lower layer, size information of a PDU it will transmit in the next transmission period. The lower layer recognizes a scheduling command of a scheduler through a predetermined physical layer channel or inner interface, and determines which upper layer will transmit a PDU and with which size, according to the scheduling command.

In step 515, the transmission device determines whether n SDUs with a size s are correctly included (bundled) in the PDU when it generates the PDU according to the determined PDU size. If n SDUs with a size s are correctly contained in the PDU, in other words, if n SDUs with a size s are included in a payload of the PDU and the last byte of an $n^{th}$ SDU is identical to the last byte of the payload, the transmission device includes the n SDUs in the payload of the PDU and sets indicator 1 of the PDU header as 'on', in step 520, thereby generating the PDU. In this case, the length indicators are omitted.

However, if n SDUs with a size s are not correctly included in the PDU, the transmission device includes SDUs in the payload part of the PDU, and expresses a size of each of the SDUs or a position of the last byte using the length indicators in step 525. Thereafter, in step 530, the transmission device generates the PDU by setting indicator 1 to 'off'.

After step 520 or step 530, the transmission device delivers the PDU generated by inserting indicator 1 or length indicators to the lower layer in step 535.

Figure 6:
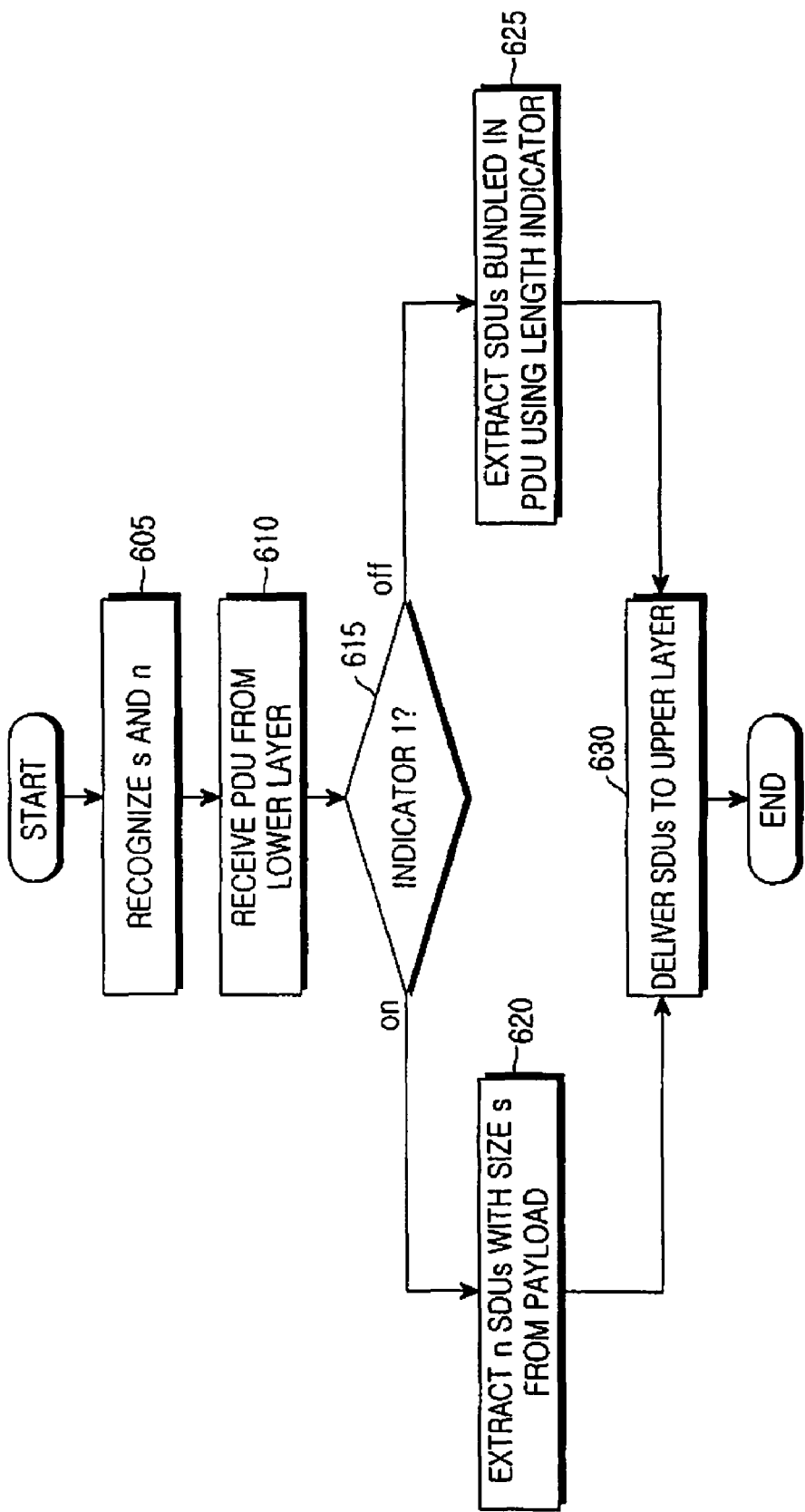
FIG. 6 illustrates an operation of a reception device according to the first embodiment of the present invention.

FIG. 6 illustrates an operation of a reception device according to the first embodiment of the present invention. Referring to FIG. 6, a reception device recognizes setting conditions s and n of indicator 1 in step 605. The s and n are delivered to the reception device in a call setup process.

If the reception device receives a PDU provided from a lower layer in step 610, it checks indicator 1 of the PDU in step 615. If indicator 1 is set as 'on', in step 620, the reception device extracts SDUs from the PDU. Because indicator 1 is set as 'on', n SDUs with a size s are contained in the PDU. Therefore, the reception device extracts n SDUs by dividing the payload of the PDU by s bytes beginning from the first byte. Thereafter, in step 630, the reception device delivers the SDUs to an upper layer.

If indicator 1 is set as 'off', in step 625, the reception device extracts SDUs from the PDU. In this case, because indicator 1 is set as 'off', as many length indicators as the number of SDUs are included in the PDU, and the reception device recognizes a position of the last byte of SDUs bundled in the PDU using the length indicator information of the PDU, and sequentially extracts the SDUs. Thereafter, in step 630, the reception device delivers the extracted SDUs to the upper layer.

Second Embodiment

The second embodiment of the present invention proposes a method for signaling, using indicator 1, information indicating that (n−1) SDUs with a size s and the remaining one SDU, a size of which can be estimated from a size of an arbitrary PDU, are bundled in the corresponding PDU.

In transmitting and/or receiving a PDU of an arbitrary protocol layer x, a transmission side signals a size of the PDU to a reception side through a header of the next lower protocol layer of the protocol layer x or through a separate control signal. For example, a size of the RLC PDU is indicated in a MAC header, and a size of a MAC PDU is notified to the reception device by a physical layer control signal. When the surplus information indicates the size of the PDU, it is possible to use indicator 1 and more flexibly set a size of the last SDU included in the PDU. For example, the transmission device and the reception device define indicator 1 as an indicator that indicates that (n−1) SDUs with a size s and the remaining one SDU, a size of which can be estimated from a size of an arbitrary PDU, are bundled in the corresponding PDU.

Figure 7:
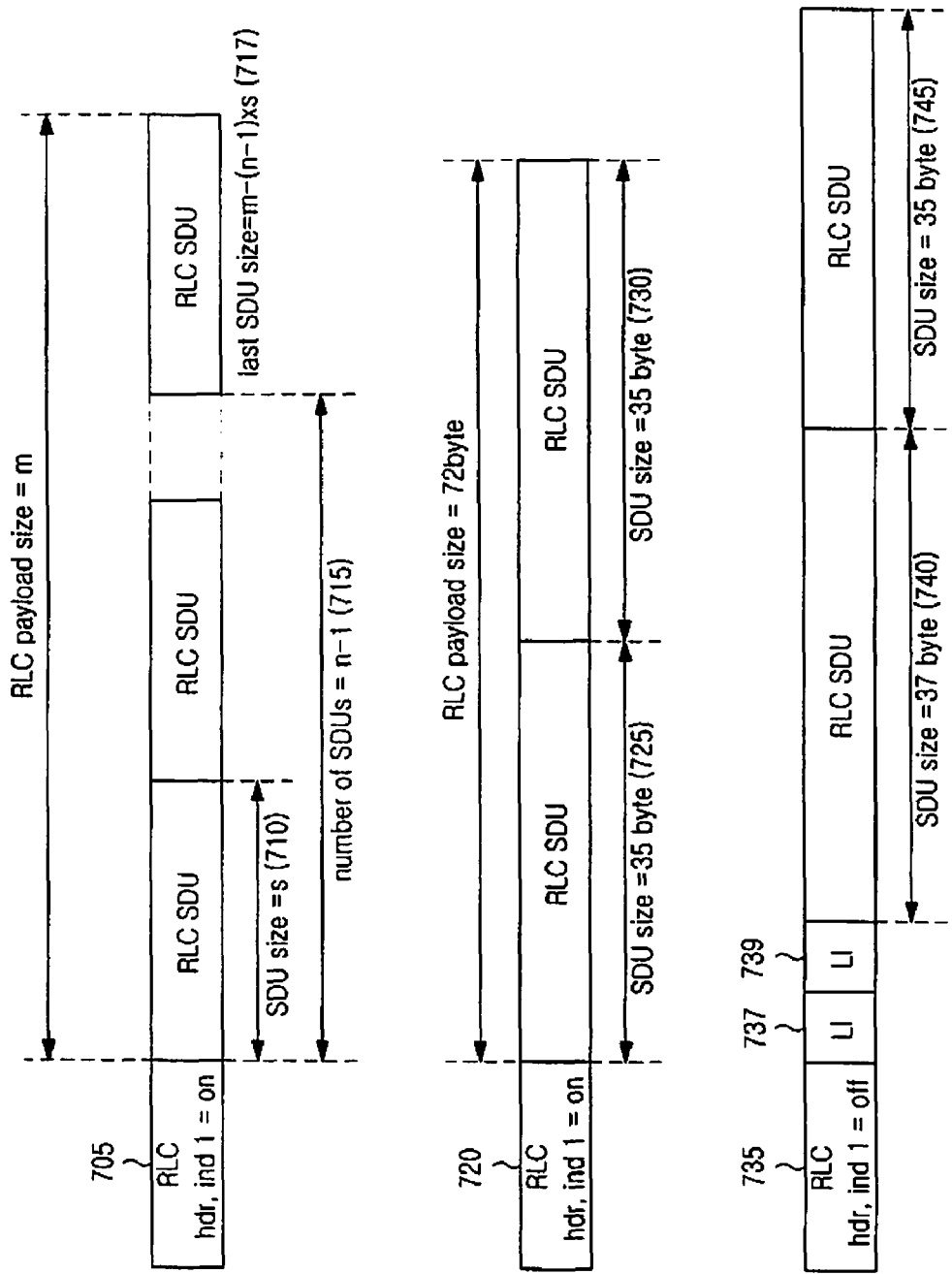
FIG. 7 illustrates an operation of a transmission device according to a second embodiment of the present invention.

FIG. 7 illustrates an operation of a transmission device according to the second embodiment of the present invention. It is assumed that (n−1) SDUs 715 with a size=s 710 are sequentially contained in an RLC PDU with indicator 1='on' 705, beginning from the front of a payload, and one SDU 717 with a size={size of payload−s*(n−1)} is contained following them. The size of the payload is a value obtained by subtracting the size of the PDU header from the size of the PDU, and is denoted herein by "m".

If indicator 1 is defined as above, even though the size of the SDUs contained in the PDU is different from a predetermined size, it is possible to use indicator 1 and it is also possible to further reduce the overhead caused by length indicators by increasing the frequency of uses of indicator 1.

For example, in an exemplary case where n=2 and s=35, if a size of a first SDU is 35 bytes, the transmission side can use indicator 1 regardless of a size of a second SDU. That is, if indicator 1 of a PDU header containing a first SDU 725 with a 35-byte size and a second SDU 730 with a 37-byte size is set as 'on' (See 720), the reception side can demultiplex SDUs from the PDU even without using length indicators.

More specifically, upon receipt of a PDU with indicator 1 being set 'on', the reception device recognizes that the last SDU extends from the next byte of the last byte of the just-previous SDU till the last byte of the PDU, and operates according thereto.

If a size of the remaining SDU except for the last SDU is not identical to a predefined value s, the transmission side sets indicator 1 as 'off', and expresses a size of the SDU or a position of the last byte of the SDU using the normal length indicators.

For example, if an SDU 740 with a 37-byte size and an SDU 745 with a 35-byte size are contained in one PDU, the transmission device sets indicator 1 of the PDU header as 'off' (See 735), and expresses a first length indicator 737 as 37 and a second length indicator 739 as 72.

Figure 8:
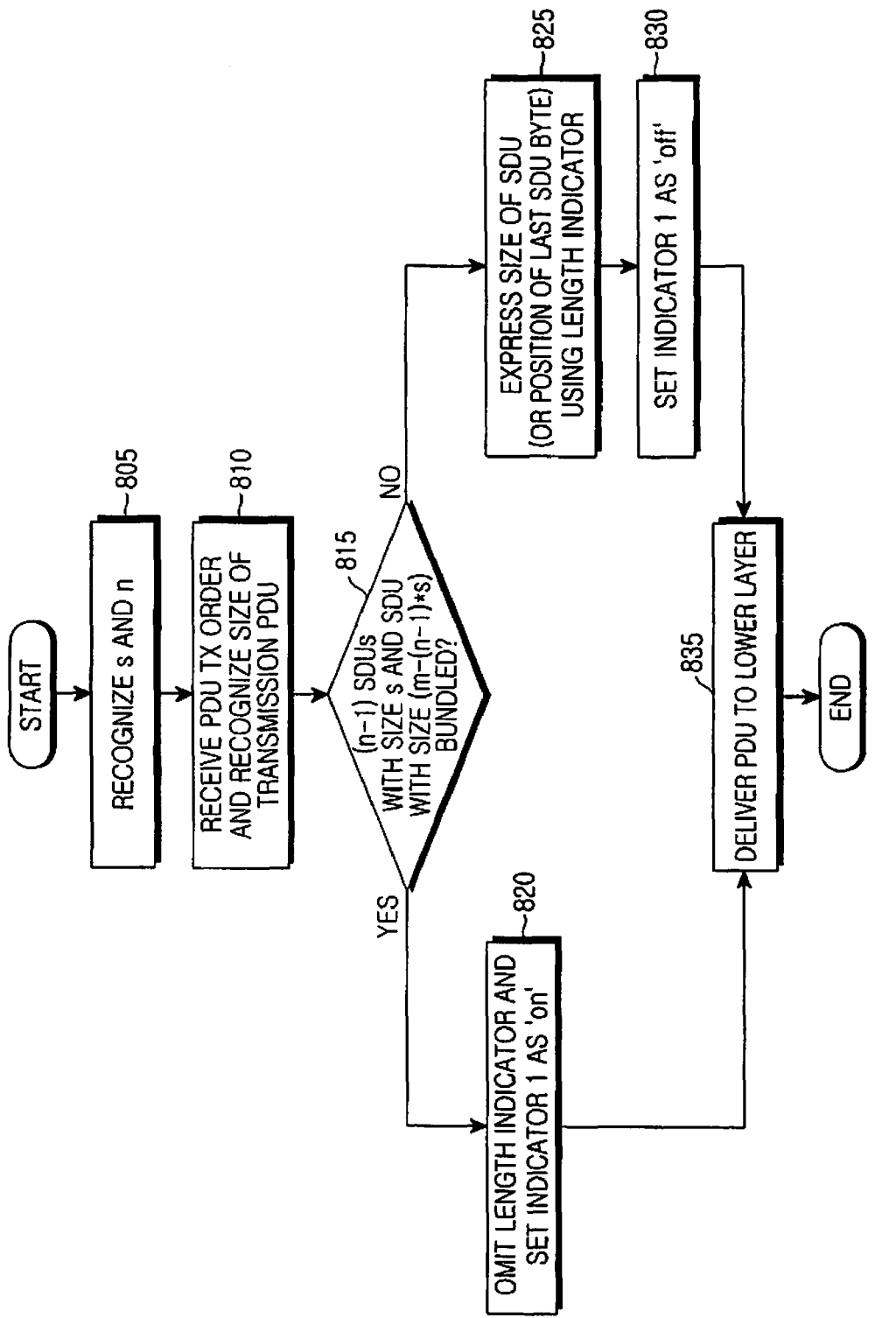
FIG. 8 illustrates an operation of a transmission device according to the second embodiment of the present invention.

FIG. 8 illustrates an operation of a transmission device according to the second embodiment of the present invention. Referring to FIG. 8, a transmission device recognizes setting conditions s and n of indicator 1 in step 805. The s and n are notified to the transmission device in a call setup process.

In step 810, the transmission device receives from a lower layer an order to generate a PDU it will transmit in the next transmission period, and to deliver the PDU to the lower layer. At this time, the transmission device receives the information on a size of the PDU.

In step 815, the transmission device checks whether another SDU is fully contained in the space left after including (n−1) SDUs with size s in a payload of the PDU when it generates the PDU according to the size of the PDU. That is, n perfect SDUs are contained in an arbitrary PDU, and the transmission device checks whether a size of all (n−1) SDUs contained in the front of the payload is s and a size of the last SDU is {m−(n−1)*s}.

If (n−1) SDUs with a size s and one SDU with a size={m−(n−1)*s} are contained in the PDU, the transmission device sequentially includes the SDUs in a payload part of the PDU and attaches a header thereto, in step 820, thereby making a PDU. At this time, the normal length indicators are unused, and indicator 1 is set as 'on'.

If the condition of step 815 is unsatisfied, the transmission device sequentially includes the SDUs in a payload part of the PDU, and expresses a size of the SDUs or a position of the last byte of the SDUs using the normal length indicators in step 825. Thereafter, in step 830, the transmission device generates the PDU by setting indicator 1 as 'off'.

After step 820 or 830, the transmission device delivers the generated PDU to the lower layer in step 835.

Figure 9:
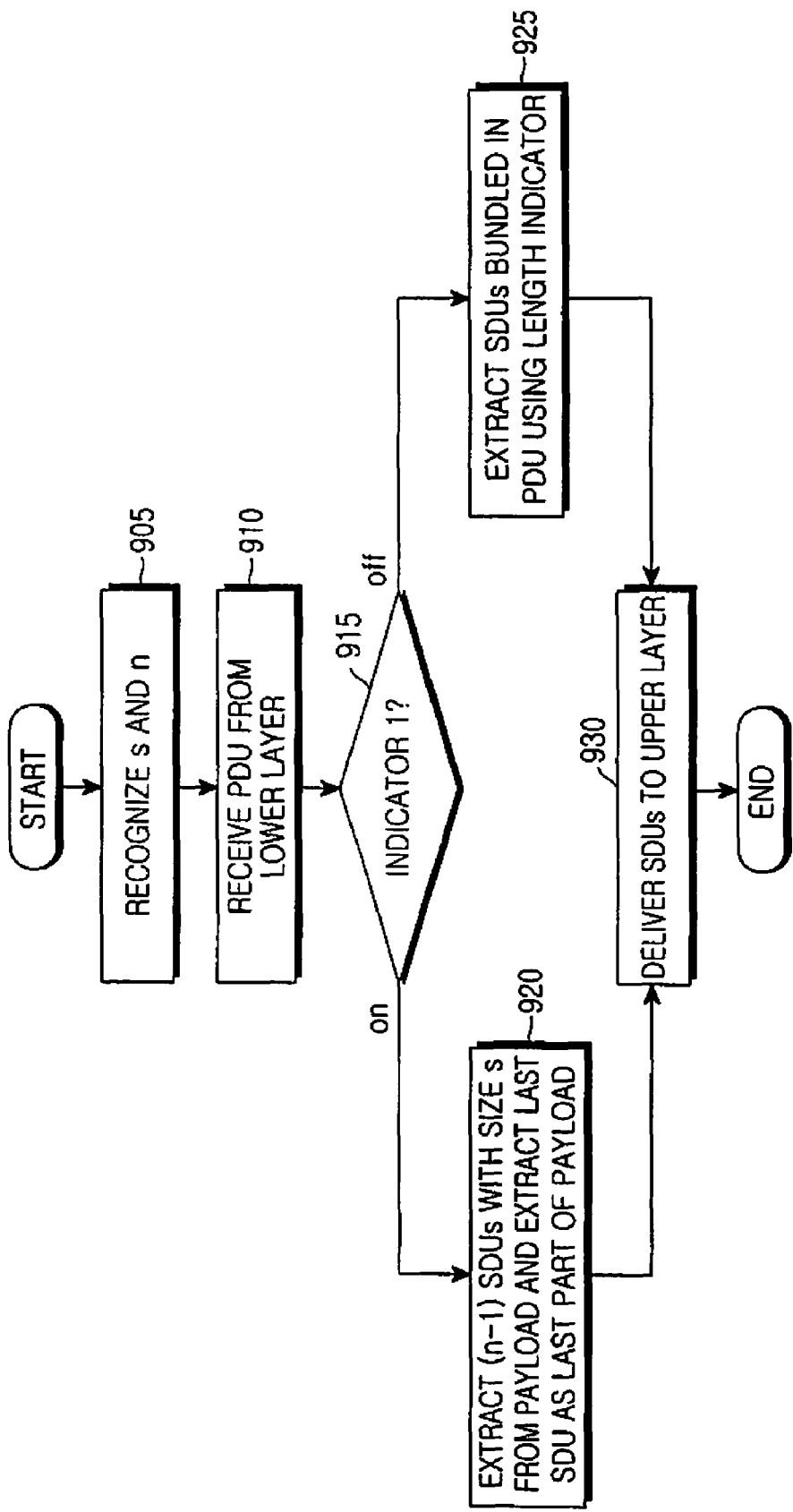
FIG. 9 illustrates an operation of a reception device according to the second embodiment of the present invention.

FIG. 9 illustrates an operation of a reception device according to the second embodiment of the present invention. Referring to FIG. 9, a reception device recognizes setting conditions s and n of indicator 1 in step 905. The s and n are notified to the reception device in a call setup process.

If the reception device receives a PDU from a lower layer in step 910, it checks indicator 1 of the PDU in step 915. If indicator 1 is set as 'on', in step 920, the reception device extracts SDUs from the PDU. In this case, since indicator 1='on', (n−1) SDUs with a size s and one SDU with a size={m−(n−1)*s} are sequentially contained in a payload of the PDU. Therefore, the reception device extracts SDUs by dividing the payload of the PDU by s bytes beginning from the first byte. The payload part left after repeating the process (n−1) times is considered as the last SDU. Thereafter, in step 930, the reception device delivers the extracted SDUs to the upper layer.

However, if indicator 1 is set as 'off', in step 925, the reception device extracts SDUs from the PDU. In this case, because indicator 1='off', length indicators for the SDUs are included in the PDU, and the reception device recognizes a position of the last byte of the SDUs contained in the PDU using the length indicator information, and sequentially extracts the SDUs. Thereafter, in step 930, the reception device delivers the extracted SDUs to the upper layer.

Third Embodiment

The third embodiment of the present invention proposes a method for signaling, using indicator 1, information indicating that n SDUs with a size=m/n are contained in an arbitrary PDU. Here, m denotes a payload size of the PDU, and is a value obtained by subtracting a size of a PDU header from the total size of the PDU.

When the third embodiment of the present invention is used, once SDUs bundled in one PDU are equal in size, it is possible to use indicator 1 regardless of the actual size of the SDUs. Therefore, it is possible to increase the frequency of uses of indicator 1, resulting in a reduction in the overhead caused by length indicators.

Figure 10:
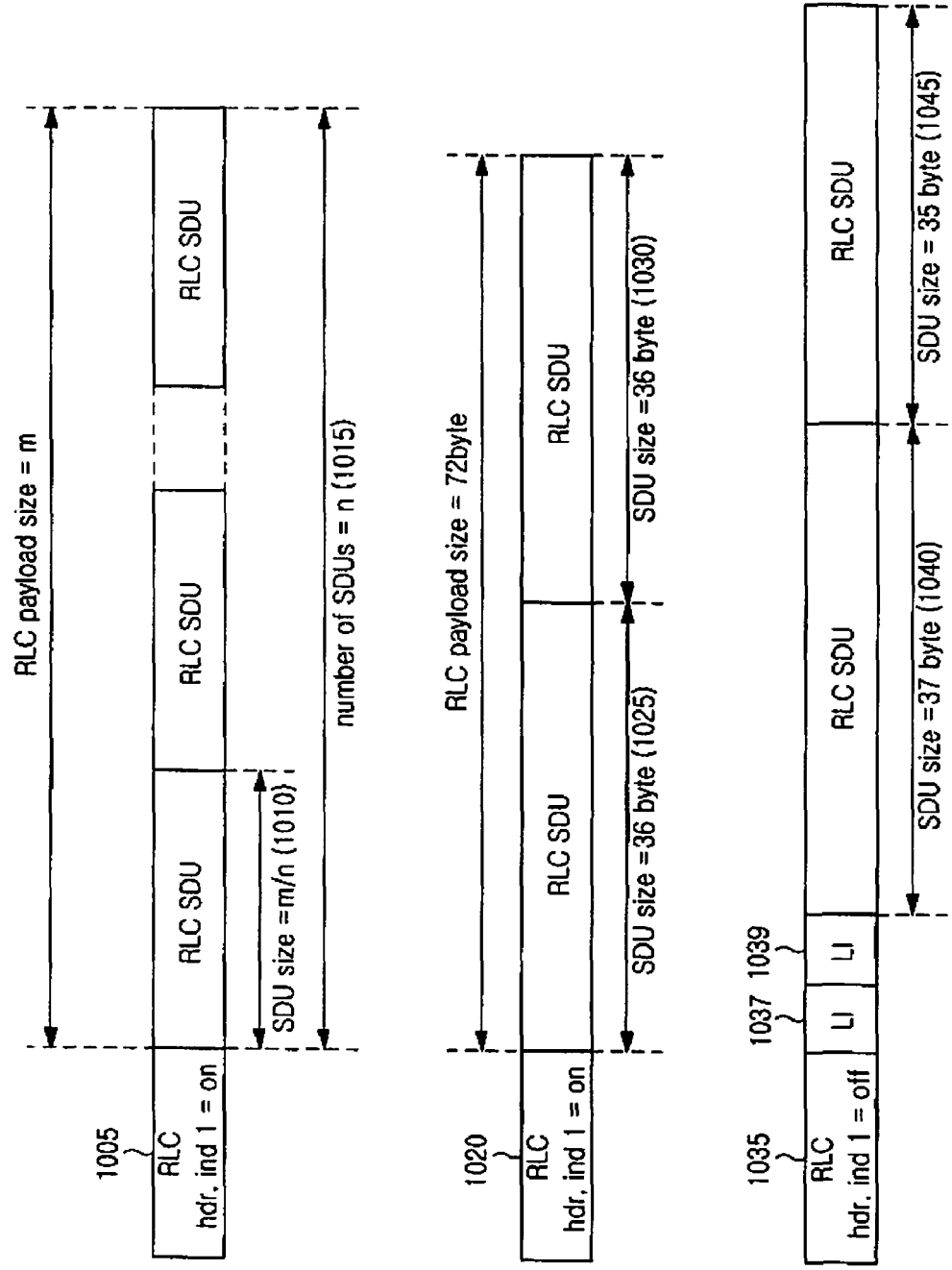
FIG. 10 illustrates indicator 1 according to a third embodiment of the present invention.

FIG. 10 illustrates indicator 1 according to the third embodiment of the present invention. It is assumed that n SDUs 1015 with a size-m/n 1010 are contained in an RLC PDU with indicator 1='on' 1005, and the last byte of the last SDU is identical to the last byte of the PDU payload. Here, m denotes a payload size of the PDU, and is a value obtained by subtracting a size of the PDU header from the total size of the PDU.

If indicator 1 is defined as above, it is possible to use indicator 1 regardless of the size of SDUs, so that it is possible to increase the frequency of uses of indicator 1 and to further reduce the length indicator overhead.

For example, where n=2, when a first SDU 1025 and a second SDU 1030 are both 36 bytes in size, the transmission device sets indicator 1 as 'on' (See 1020), and generates a PDU by including the SDUs 1025 and 1030 in the payload, with length indicators omitted. Because a size of the PDU will be indicated in the header of the lower layer, the reception device induces a size of the payload from the size of the PDU, and induces a size of the SDUs contained in the PDU by dividing the payload size by 2.

However, if the SDUs contained in one PDU are not identical in size, the reception device sets indicator 1 as 'off', and indicates a size of each SDU and a position of the last byte using length indicators as done in the conventional method.

Figure 11:
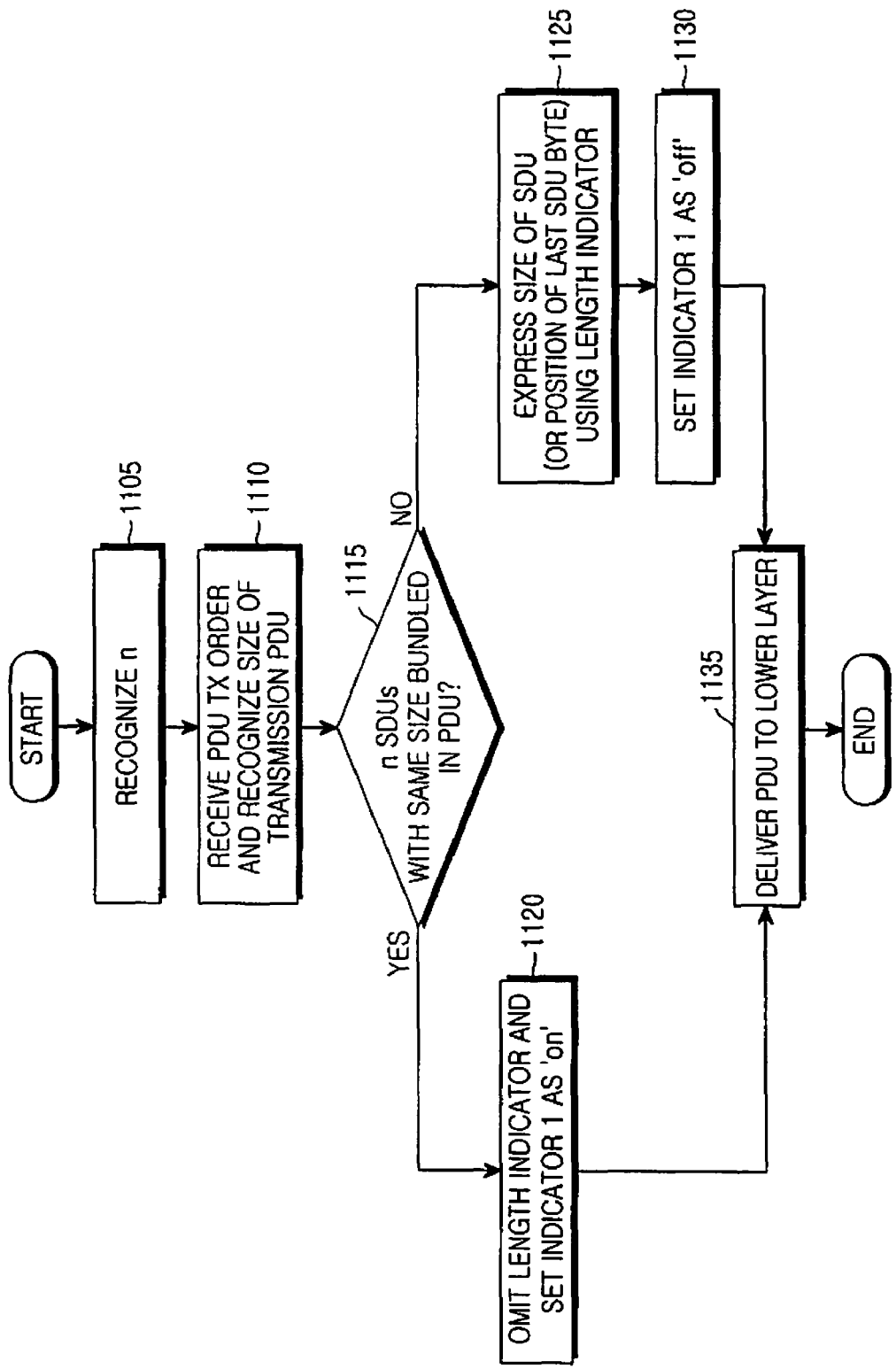
FIG. 11 illustrates an operation of a transmission device according to the third embodiment of the present invention.

FIG. 11 illustrates an operation of a transmission device according to the third embodiment of the present invention. Referring to FIG. 11, a transmission device recognizes a setting condition n of indicator 1 in step 1105. The n is notified to the transmission device in a call setup process.

In step 1110, the transmission device receives, from a lower layer, an order to generate a PDU it will transmit in the next transmission period, and to deliver it to the lower layer. The transmission device receives even the information on a size of the PDU.

In step 1115, the transmission device checks whether n SDUs with the same size are contained in a payload of the PDU when it generates the PDU according to the PDU size.

If n SDUs with the same size are contained in the PDU and the last byte of an $n^{th}$ SDU is identical to the last byte of the payload of the PDU, the transmission device sequentially includes the SDUs in the payload part of the PDU and attaches a header thereto, in step 1120, thereby generating the PDU. At this point, the transmission device does not use the normal length indicators and sets indicator 1 as 'on'.

If the condition of step 1115 is unsatisfied, the transmission device sequentially includes the SDUs in the payload part of the PDU and attaches a header thereto, in step 1125, thereby generating the PDU. At this point, the transmission device expresses a size of the SDUs or a position of the last byte using length indicators. Thereafter, in step 1130, the transmission device sets indicator 1 as 'off'.

After step 1120 or step 1130, the transmission device delivers the generated PDU to the lower layer in step 1135.

Figure 12:
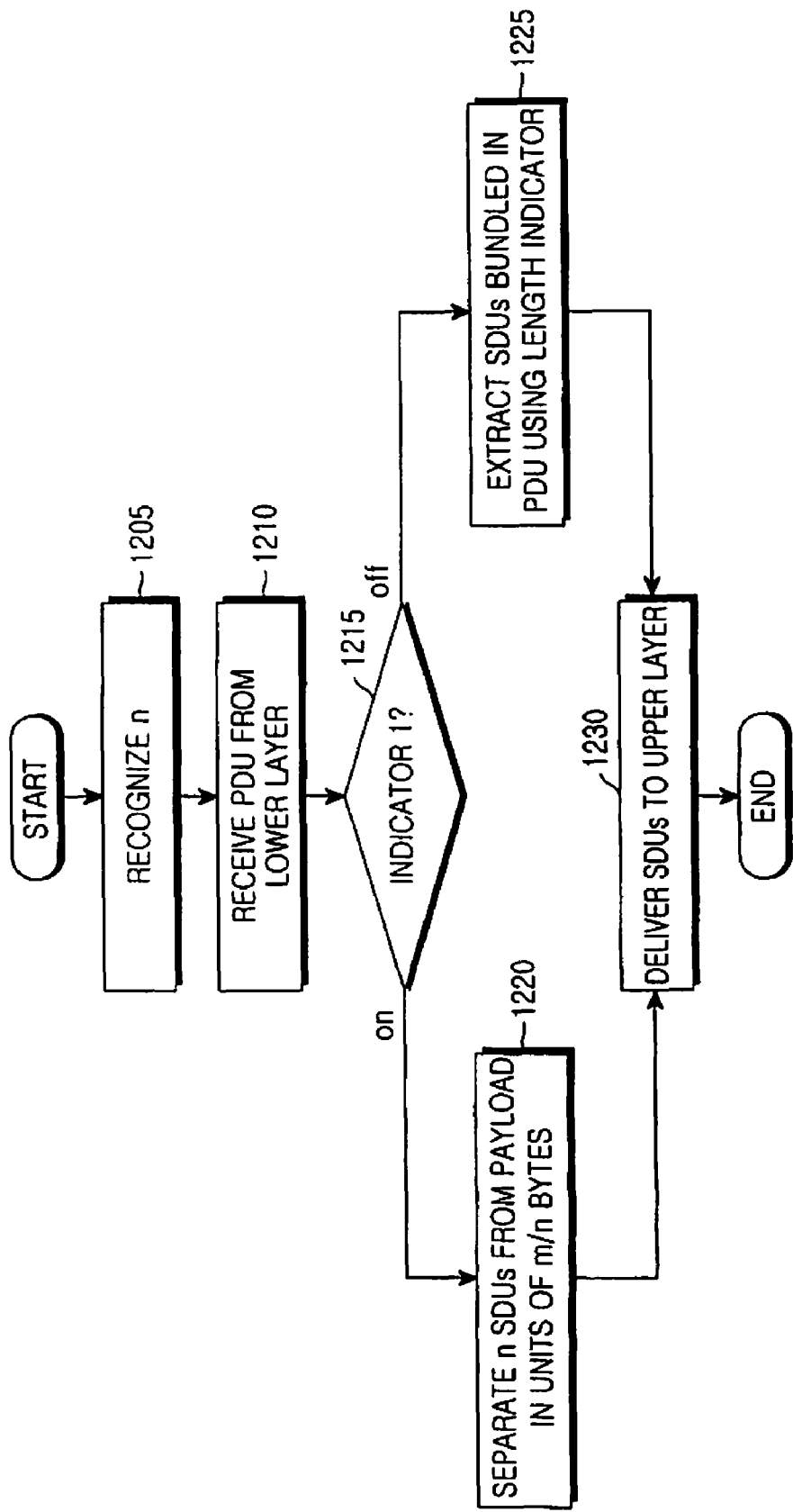
FIG. 12 illustrates an operation of a reception device according to the third embodiment of the present invention.

FIG. 12 illustrates an operation of a reception device according to the third embodiment of the present invention. Referring to FIG. 12, a reception device recognizes a setting condition n of indicator 1 in step 1205. The n is notified to the reception device in a call setup process.

If the reception device receives a PDU from a lower layer in step 1210, it checks indicator 1 of the PDU in step 1215. The reception device proceeds to step 1220 for and to step 1225 for indicator 1='off'.

When indicator 1='on', in step 1220, the reception device extracts SDUs from the PDU. In this case, because the indicator 1='on', n SDUs with an (m/n)-byte size are contained in a payload of the PDU. Therefore, the reception device extracts n SDUs by dividing the payload of the PDU by m/n bytes beginning from the first byte. Thereafter, in step 1230, the reception device delivers the extracted SDUs to the upper layer.

When indicator 1='off', in step 1225, the reception device extracts SDUs from the PDU. In this case, because indicator 1='off', length indicators are included in the PDU. Therefore, the reception device recognizes a position of the last byte of the SDUs contained in the PDU using the length indicator information of the PDU, and sequentially extracts the SDUs. Thereafter, in step 1230, the reception device delivers the extracted SDUs to the upper layer.

The first to third embodiments of the present invention can separately define a indicator__1 field with a 1-bit size in the PDU header for indicator 1, or combine it with another field of the PDU header to reduce overhead caused by the indicator__1 field.

Figure 13A:
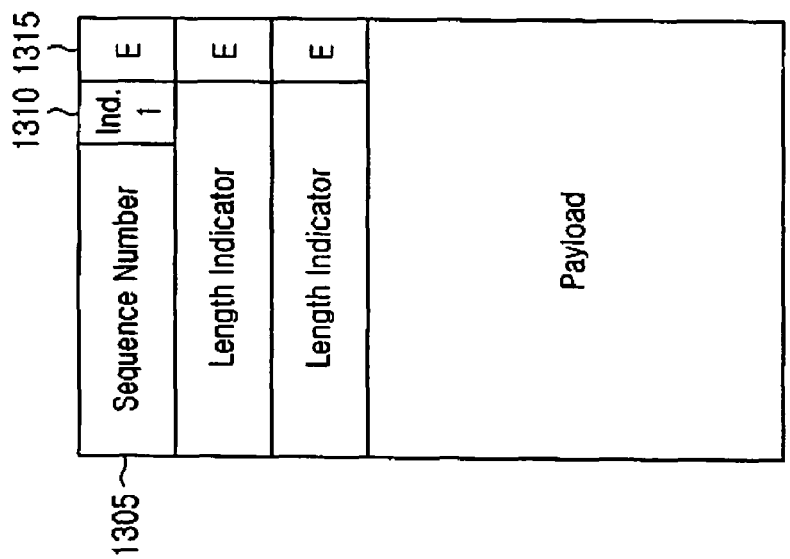
FIGS. 13A, 13B, and 13C illustrate indicator 1 in an RLC PDU header when the present invention is applied to RLC.
Figure 13B:
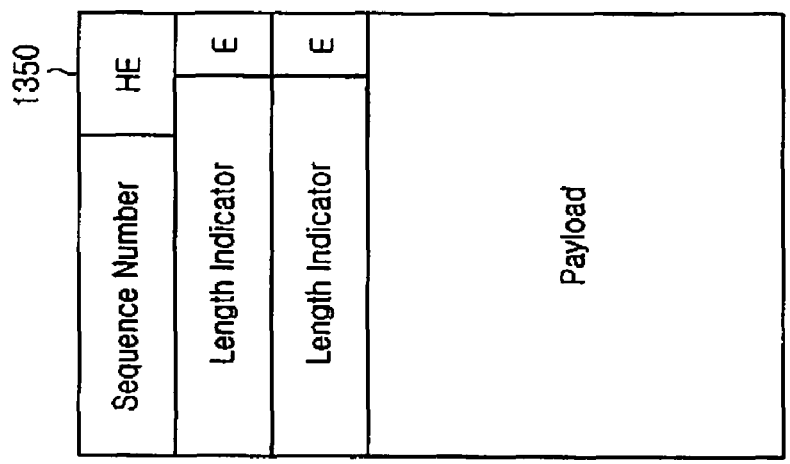
Figure 13C:
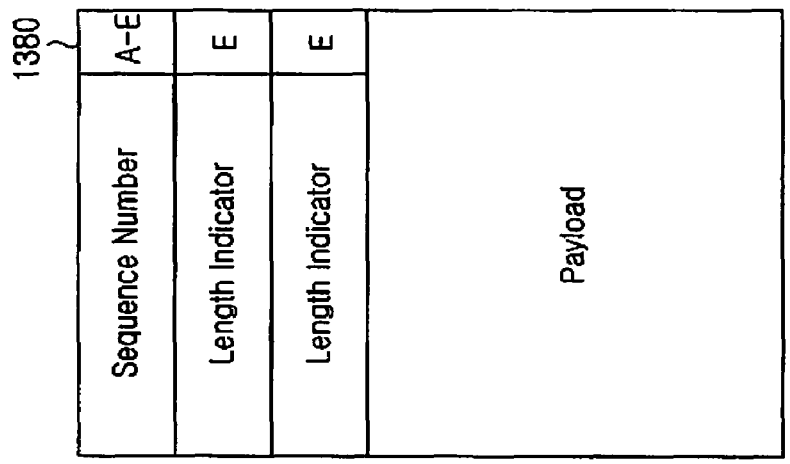

FIGS. 13A, 13B, and 13C illustrate an exemplary indicator 1 in an RLC PDU header when the present invention is applied to RLC. Referring to FIGS. 13A, 13B, and 13C, an RLC PDU header is normally composed of a sequence number, E bits, and length indicators. The sequence number exists in all RLC PDUs, and the length indicators can either exist or not exist according to whether the last byte of SDUs exists in a payload.

The simplest method for inserting indicator 1 into the RLC PDU header is to separately define an indicator__1 field in the RLC PDU header. That is, as illustrated in FIG. 13A, the method defines a 1-bit indicator__1 field 1310 between a sequence number 1305 and a first E bit 1315, and can code '1' for indicator 1='on' and '0' for indicator 1='off'.

This method is advantageous in that it is simplest and explicit, but may suffer an error situation where signaling is generated to indicate that indicator 1 is coded as 'on' and length indicators exist. Therefore, a separate solution for the error situation should be defined.

A second method, as illustrated in FIG. 13B, extends the first E field to 2 bits, and can define the following meaning for each code point. For convenience, the E field extended to 2 bits will be referred to herein Header Extension (HE) 1350.

00: Indicates that no length indicator exist, the next byte is a payload, and indicator 1='off'.

01: Indicates that no length indicator exist, the next byte is a length indicator and an E bit, and indicator 1='off'.

10: Indicates that no length indicator exist, and indicator 1='on'.

11: reserved

Another method, considering that length indicators and indicator 1 are not used together, can signal on/off of the length indicators even without using E bits as shown in FIG. 13C. That is, this method defines the first E bit as follows. For convenience, the first E bit will be referred to herein as an Alternative E (A-E) bit 1380.

0: Indicates that indicator 1='on' and the next byte is a payload (i.e., no length indicator exist).

1: Indicates that indicator 1='off' and the next byte is a length indicator and an E bit.

Figure 14:
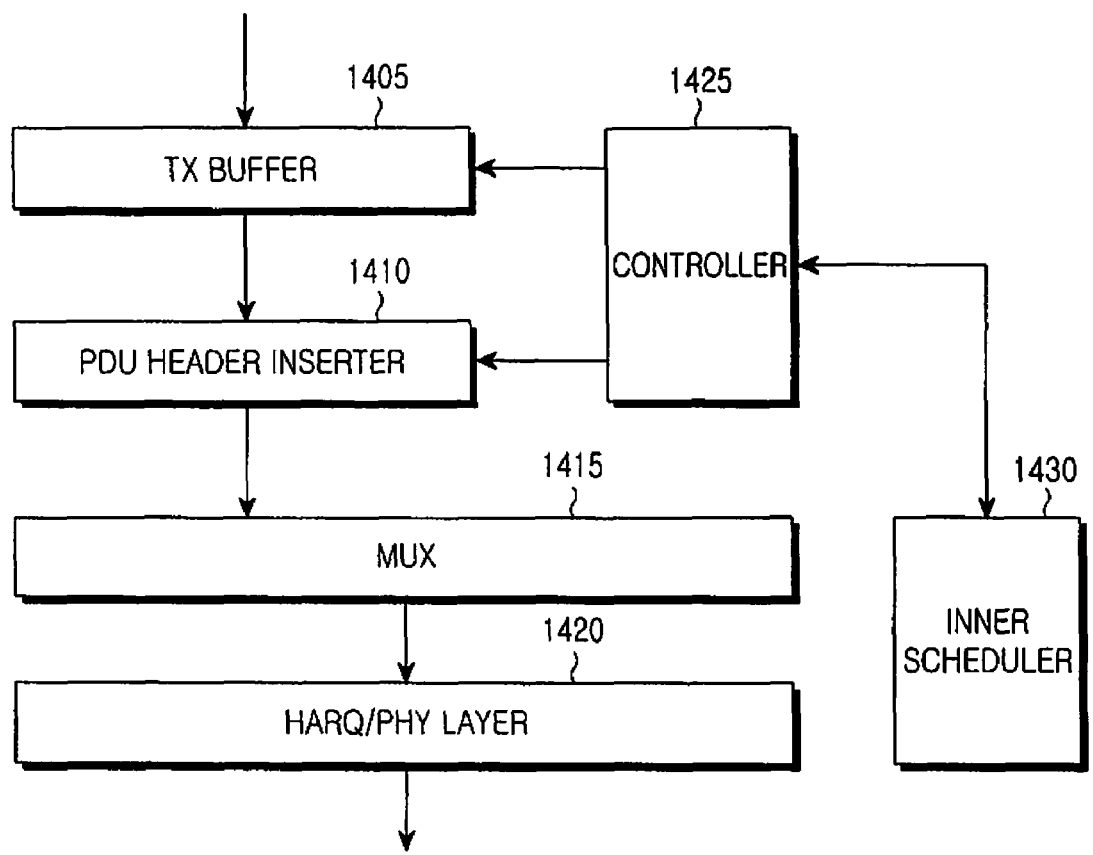
FIG. 14 illustrates a structure of a transmission device according to an embodiment of the present invention.

FIG. 14 illustrates a structure of a transmission device according to an embodiment of the present invention. Referring to FIG. 14, a transmission device according to an embodiment of the present invention includes a transmission (TX) buffer 1405, a PDU header inserter 1410, a controller 1425, a multiplexer (MUX) 1415, HARQ/physical (PHY) layer device 1420, and an inner scheduler 1430.

SDUs delivered from an upper layer are stored in the transmission buffer 1405 in delivery order. The controller 1425 provides the inner scheduler 1430 with the information the inner scheduler 1430 needs to distribute its allocated transmission resources, such as a size and the number of SDUs stored in the transmission buffer 1405.

The inner scheduler 1430 recognizes the size of data a particular UE can transmit over a radio channel or inner interface in the next transmission period, determines the amount of data to be transmitted for each service, based on the amount of data stored in the transmission buffer 1405 constructed for each service and the priorities of services, and notifies the controller 1425 of the byte size of a PDU it will generated.

Upon receiving a notification from the inner scheduler 1430 indicating a size of the PDU it will transmit in the next transmission period, the controller 1425 controls the transmission buffer 1405 and the PDU header inserter 1410 to generate a PDU according to the size. The controller 1425 controls the transmission buffer 1405 so as to deliver SDUs containable in a payload of the PDU to the PDU header inserter 1410 beginning from the SDU that has first arrived at the transmission buffer 1405. If a size of the PDU is not large enough to contain the last SDU, the controller 1425 can resegment the last SDU. The controller 1425 controls the PDU header inserter 1410 to insert a PDU header into a PDU payload part provided from the transmission buffer 1405. A sequence number, indicator 1, and length indicator(s) can be inserted into the PDU header, and if the number of or a size of SDUs contained in the PDU payload part is identical to a predetermined condition, the controller 1425 omits the length indicator and sets indicator 1 as 'on'.

The PDU header inserter 1410 delivers the PDU to the multiplexer 1415, and the multiplexer 1415 multiplexes PDUs generated in several transmission buffers 1405, to the payload part, attaches a MAC header including multiplexing information thereto to generate a MAC PDU, and then delivers it to the HARQ/physical layer device 1420.

The HARQ/physical layer device 1420 transmits the MAC PDU to a reception device through a predetermined HARQ process.

Figure 15:
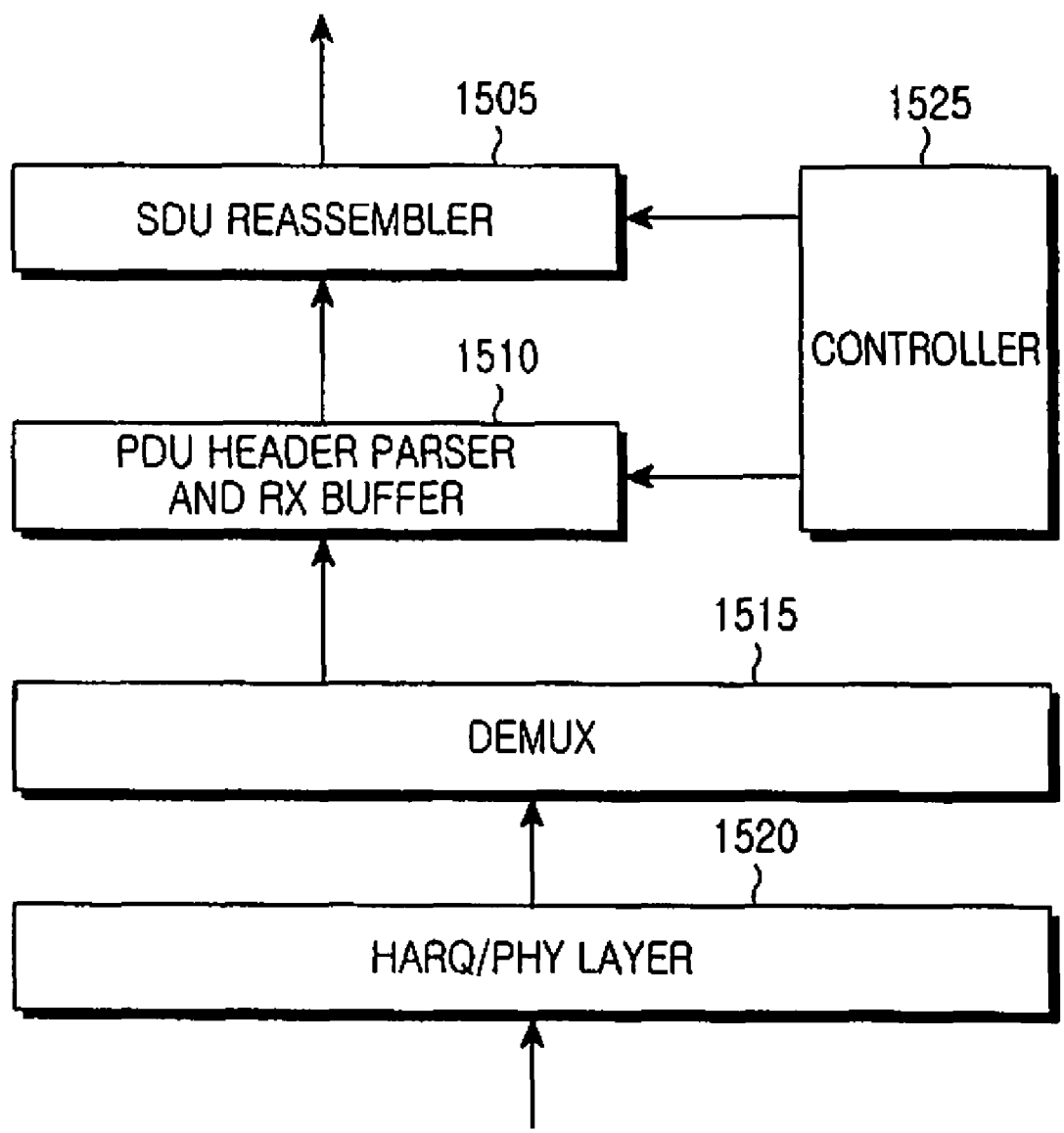
FIG. 15 illustrates a structure of a reception device according to an embodiment of the present invention.

FIG. 15 illustrates a structure of a reception device according to an embodiment of the present invention. Referring to FIG. 15, a reception device according to an embodiment of the present invention includes an SDU reassembler 1505, a PDU header parser and reception (RX) buffer 1510, a controller 1525, a demultiplexer (DEMUX) 1515, and a HARQ/physical layer device 1520.

The HARQ/physical layer device 1520 receives a MAC PDU through a predetermined HARQ process, and delivers it to the demultiplexer 1515. The demultiplexer 1515 demultiplexes the MAC PDUs into an upper layer PDU referring to a header of the MAC PDU, and then delivers it to a proper reception buffer 1510.

The PDU header parser and reception buffer 1510 checks the header of the received PDU, delivers the PDUs reassemblable into SDU to the SDU reassembler 1505 and stores the PDUs non-reassemblable into SDU.

The controller 1525 notifies the PDU header parser and reception buffer 1510 of the definition of indicator 1, and the PDU header parser and reception buffer 1510 determines whether SDU reassembly is possible, referring to on/off of indicator 1.

The SDU reassembler 1505 separates SDUs from the PDU payload depending on the sequence number, length indicator, and indicator 1 in the PDU header, and delivers the SDUs to an upper layer. The controller 1525 recognizes the definition of indicator 1 in a call setup process, and notifies it to the PDU header parser and reception buffer 1510 and the SDU reassembler 1505.

As is apparent from the foregoing description, the present invention previously sets the number of and a size of particular upper layer packets in a call setup process, and if the number of and a size of the upper layer packets contained in a lower layer packet match the predetermined value, includes an indicator indicating the coincidence in the header. Consequently, it is possible to reduce the overhead that may occur when an absolute value of the packet size is notified.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting a packet in a mobile communication system, the method comprising:
   receiving first packets from an upper layer;
   generating a second packet using the first packets and a header including an indicator that indicates if a number of and a size of the first packets to be bundled in the second packet satisfy a predetermined condition; and
   transmitting the generated second packet via a lower layer, wherein the indicator is set as 'on' and a length indicator indicating a length of each of the first packets is omitted from the header, when the number of and the size of the first packets to be bundled in the second packet satisfy the predetermined condition.

2. The method of claim 1, wherein:
   the indicator is set as 'off' and the length indicator indicating the length of each of the first packets is inserted into the header, when the number of and the size of the first packets to be bundled in the second packet do not satisfy the predetermined condition.

3. The method of claim 1, wherein the indicator indicates whether the number of the first packets all have the size.

4. The method of claim 3, wherein the indicator indicates whether a size of a payload of the second packet and the number of the first packets all have a size obtained by dividing the size of the payload by the number of the first packets.

5. The method of claim 1, wherein the indicator indicates whether all of the first packets, except for a first packet located in a last position among the first packets, have a same size.

6. A method for receiving a packet in a mobile communication system, the method comprising:
   receiving, from a lower layer, a second packet including an indicator in a header, which indicates if a number of and a size of first packets bundled in the second packet satisfy a predetermined condition;
   extracting the first packets from the second packet using the indicator; and
   transmitting the extracted first packets to an upper layer, wherein the indicator indicates if the number of the first packets all have the size, and
   wherein extracting the first packets from the second packet comprises extracting the number of the first packets having the size from the second packet, when the indicator is set as 'on'.

7. The method of claim 6, wherein extracting the first packets from the second packet further comprises:
   when the indicator is set as 'off', extracting the first packets from the second packet using a length indicator included in a header of the second packet.

8. The method of claim 6, wherein the indicator indicates if a size of a payload of the second packet and the number of the first packets all have a size obtained by dividing the size of the payload by the number of the first packets.

9. The method of claim 8, wherein the extracting the first packets from the second packet comprises:
   when the indicator is set as 'off', extracting the first packets from the second packet, using a length indicator included in a header of the second packet.

10. The method of claim 6, wherein the indicator indicates whether all the first packets, except for a first packet located in a last position among the first packets, (n−1) first packets, have a same size, and indicates a size of the (n−1) first packets and a size of the first packet located in the last position, where n is an integer.

11. The method of claim 10, wherein the extracting the first packets from the second packet comprises:
when the indicator is set as 'on', extracting the first packets from the second packet, using the size of the (n−1) first packets and the size of the first packet located in the last position.

12. An apparatus for transmitting a packet in a mobile communication system, the apparatus comprising:
a transmission buffer for receiving first packets from an upper layer; and
a physical layer device for transmitting a second packet via a lower layer,
wherein the second packet is generated using the first packets and a header including an indicator that indicates if a number of and a size of the first packets to be bundled in the second packet satisfy a predetermined condition, and,
wherein when the number of and the size of the first packets to be bundled in the second packet satisfy the predetermined condition, the indicator is set as 'on' and a length indicator indicating a length of each of the first packets is omitted from the header.

13. The apparatus of claim 12, wherein when the number of and the size of the first packets to be bundled in the second packet do not satisfy the predetermined condition, the indicator is set as 'off' and a the length indicator indicating the length of each of the first packets is inserted into the header.

14. The apparatus of claim 12, wherein the indicator indicates if the number of the first packets all have the size.

15. The apparatus of claim 14, wherein the indicator indicates whether a size of a payload of the second packet and the number of the first packets all have a size obtained by dividing the size of the payload by the number of the first packets.

16. The apparatus of claim 12, wherein the indicator indicates if all of the first packets, except for a first packet located in a last position among the first packets, have a same size.

17. An apparatus for receiving a packet in a mobile communication system, the apparatus comprising:
a physical layer device for receiving a second packet from a lower layer;
a demultiplexer for demultiplexing the second packet depending on a header of the second packet;
a header parser for recognizing a number of and a size of first packets bundled in the second packet from an indicator included in the header, the indicator indicating if the number of and the size of the first packets bundled in the second packet satisfy a predetermined condition, and extracting the first packets from the second packet;
a reassembler for reassembling the first packets in units of service data depending on the indicator, and transmitting the reassembled first packets to an upper layer; and
a controller for notifying the predetermined condition to the header parser and the reassembler,
wherein the indicator indicates if the number of the first packets all have the size, and
wherein when the indicator is set as 'on', the header parser, under control of the controller, extracts the number of the first packets having the size from the second packet.

18. The apparatus of claim 17, wherein when the indicator is set as 'off', the header parser, under control of the controller, extracts the first packets from the second packet using a length indicator included in a header of the second packet.

19. The apparatus of claim 17, wherein the indicator indicates whether a size of a payload of the second packet and the number of the first packets all have a size obtained by dividing the size of the payload by the number of the first packets.

20. The apparatus of claim 19, wherein when the indicator is set as 'off', the header parser, under control of the controller, extracts the first packets from the second packet, using a length indicator included in a header of the second packet.

21. The apparatus of claim 17, wherein the indicator indicates if all first packets, except for a first packet located in a last position among the first packets, (n−1) first packets, have a same size, and indicates a size of the (n−1) first packets and a size of the first packet located in the last position.

22. The apparatus of claim 17, wherein when the indicator is set as 'on', the header parser, under control of the controller, extracts the first packets from the second packet, using the size of the (n−1) first packets and the size of the first packet located in the last position, where n is an integer.

* * * * *